United States Patent
Nicholson

[15] 3,643,965
[45] Feb. 22, 1972

[54] SEALING MEANS

[72] Inventor: Terence P. Nicholson, Craigmiller, Stocksfield, England

[73] Assignee: The Corrugated Packing and Sheet Metal Company, Limited, Hamsterley, Newcastle upon Tyne, England part interest

[22] Filed: Aug. 1, 1969

[21] Appl. No.: 846,692

[30] Foreign Application Priority Data

Aug. 2, 1968  Great Britain......................37,018/68

[52] U.S. Cl..................................277/75, 277/180, 277/205
[51] Int. Cl..........................................................F16j 15/08
[58] Field of Search................277/75, 180, 201, 205, 206.1, 277/206, 236, 34; 285/DIG. 18

[56] References Cited

UNITED STATES PATENTS

| | | | |
|---|---|---|---|
| 3,520,544 | 7/1970 | Taylor | 277/206 |
| 2,384,672 | 9/1945 | Gleeson | 277/201 X |
| 2,422,009 | 6/1947 | Goetze | 277/236 X |
| 3,204,971 | 9/1965 | Meriano | 277/206 X |
| 3,313,553 | 4/1967 | Gastineau | 277/236 X |
| 3,192,690 | 7/1965 | Taylor | 277/205 X |
| 3,285,615 | 11/1966 | Trbovich | 277/180 |

FOREIGN PATENTS OR APPLICATIONS 550,298  3/1923  France.....................277/206

*Primary Examiner*—Samuel B. Rothberg
*Attorney*—Jones & Lockwood

[57] ABSTRACT

A sealing washer or gasket has a hollow section formed by walls which converge but leave at least one opening between the hollow section and the high-pressure side of the seal so that an increase in fluid pressure has the effect of urging the walls outwardly, thus tending to increase the sealing pressure with the surfaces between which it is located. Means are provided to prevent the opening being entirely closed by the normal pressures used to clamp the parts sealed by the washer or gasket. The outer periphery of the sealing washer or gasket, as seen in a section which includes the axis, is either generally straight or concave.

8 Claims, 4 Drawing Figures

SEALING MEANS

In the specification of my copending Pat. application Ser. No. 694,622, filed Jan. 2, 1968 and on which the base issue fee was paid on Jan. 28, 1971 there is described and claimed a sealing washer or gasket in the form of a ring or like closed profile having a hollow section formed by walls which converge to leave an opening or a plurality of discrete openings leading to the high-pressure side of the intended seal, means being provided, where the said opening is continuous, for preventing it being entirely closed by any normal clamping pressure applied to the washer or gasket in a direction tending to close the opening.

In the sealing washers or gaskets specifically described and illustrated in FIGS. 1, 2, 4, 7 and 8 of that specification, the outer periphery, as seen in a section which includes the axis (i.e., as illustrated in all those Figures) is convex.

It has now been found that there are certain advantages if the outer periphery of the sealing washer or gasket, as seen in a section which includes the axis, is generally straight or concave. In using the expression "generally straight" it is not intended to exclude (as will hereafter appear) some interruption in the cylindrical outer surface such as would be occasioned, for example, by the presence of an annular groove round the outer surface.

In a preferred form the sealing washer or gasket has its convergent walls extended radially inwards from their region of convergence, the said extensions being made divergent so that the end portions of the walls also can seal against the faces between which the washer or gasket is clamped; in this event the extensions are preferably flattened off at their ends to give good sealing contact at these points. It is often advantageous for the sealing surfaces of the end portions of the extensions to be further apart (before the washer or gasket is clamped in position) than the other sealing surfaces of the washer or gasket.

The invention will now be further described with reference to the accompanying drawing, wherein.

Figure 1:
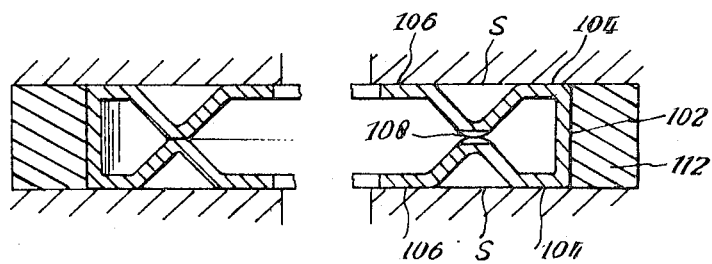
FIG. 1 shows in axial cross section one form of metal washer or gasket according to this invention.

Referring to FIG. 1, the essential difference between this washer and those illustrated in the Figures of the earlier specification above referred to is the fact that the outer periphery, as seen in cross section, is straight, i.e., the surface 102 is cylindrical. At the ends of the cylindrical surface 102 the walls of the washer form sealing surfaces 104, at right angles to the axis of the washer, then converge to meet along the central plane at right angles to the axis, diverging once more to form further sealing surfaces 106 against each of the surfaces S which are clamped against the washer. Where the walls of the washer meet between the surfaces 104 and 106, passages 108 are provided at various points, similar for example to the passages 34 in FIG. 5 of the said earlier specification, to give communication between the annular hollow within the washer and the high-pressure side of the seal to be formed by the washer.

Figure 2:
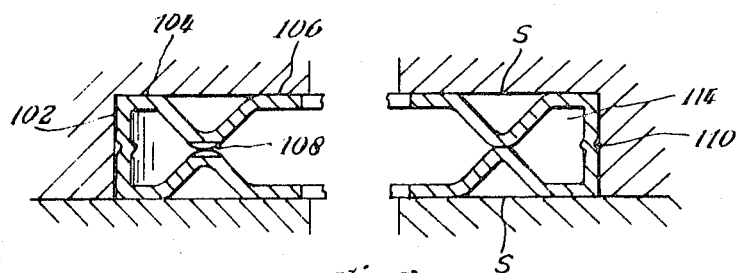
FIGS. 2, 3 and 4 show alternative forms.

The form of washer shown in FIG. 2 differs from that shown in FIG. 1 by the annular groove 110 round the outer surface 102.

The type of washer shown in FIG. 1 is for use where there is considerable accuracy of dimension in the distance between the surface S, when clamped against the washer. By reason of the cylindrical surface 102 there is very little compressibility of the washer near the outer edge of the sealing surfaces 104. This gives high sealing pressures at this circumferential area, whilst the parts of the sealing surfaces 104 nearer the axis of the washer can move and be pressed against the sealing surfaces S by the pressure within the annular space bounded in part by the walls of the washer adjacent the sealing surfaces 104 and the cylindrical surface 102. The sealing surfaces 106 are likewise pressed against the surfaces S.

The form of washer shown in FIG. 2 has a groove 110 round the surface 102 and this allows for a greater degree of tolerance as regards the distance between the surfaces S. It can be used with very light clamping loads.

In FIG. 1 the surfaces S are shown as separated by a nip control ring 112, whilst in FIG. 2 one of the surfaces is formed by the annular surface above a recess 114 in which the washer is lodged.

Figure 3:
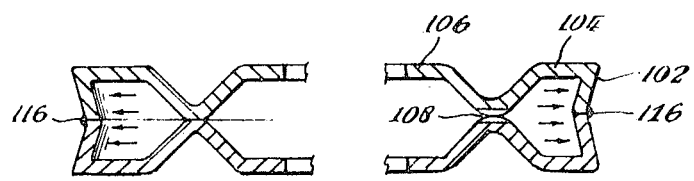

The washer of FIG. 3 is formed with a concave outer surface 102, as seen in the Figure. This washer also is adapted to be clamped between surfaces S, as illustrated for example in FIGS. 1 and 2. With the arrangement of FIG. 3, the high-pressure fluid acting against the outer wall of the washer, as shown by the arrows in FIG. 3, tends to straighten this wall and consequently to force the sealing surfaces 104 against the surfaces S, thus creating a very good seal.

In FIG. 3 the washer is shown as made in two parts, joined by a circumferential argon arc weld at 116. The washer of FIG. 2 could be fabricated in a similar fashion; the weld would then be located in the groove 110.

Figure 4:
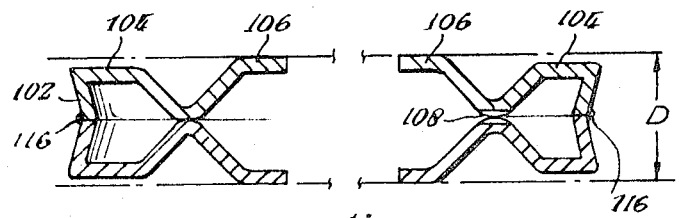

It is sometimes desirable to arrange that, as the washer is clamped in position, the sealing surfaces 106 make contact with the faces between which the washer is clamped before the sealing surfaces 104. FIG. 4 shows a washer before clamping in which the sealing surfaces 106 are spaced by a distance D which is greater than the distance between the surfaces 104. As the washer is clamped, the sealing surfaces 106 will be the first to contact the faces between which the washer is to lie, but quite a small clamping pressure will suffice to deform the ends forming the sealing surfaces 106 to bring these together and so form a seal also against the surface 104.

Each of the gaskets or washers may be provided with surfaces, for example of silver, aluminum or nickel, especially over those parts which are to form sealing surfaces.

What I claim is:

1. A sealing ring having a hollow section for sealing between spaced apart parallel surfaces, formed of sheet material of substantially uniform thickness so as to be symmetrical on either side of a median plane, the ring having sealing surfaces and a radially outwardly facing surface, the sheet material forming the said outwardly facing surface having a shape such that the smallest cylinder that would enclose the ring would contact the said surface at positions spaced from and on each side of said median plane, the sheet material forming the ring converging as walls internally of the sealing surfaces along a path to leave at least one opening leading to the high-pressure side of the intended seal, said hollow section being formed by the radially outwardly facing surface portion, the sealing surface portions and the converging walls, abutment means being provided in the path of convergence of the convergent walls for preventing these walls from being brought by normal clamping pressure into continuous abutting relation so as to deny fluid access between the said convergent walls to the hollow section.

2. A sealing ring according to claim 1 wherein said radially outwardly facing surface is cylindrical.

3. A sealing ring according to claim 1 wherein said radially outwardly facing surface is cylindrical with an annular groove therein.

4. A sealing ring according to claim 1 wherein said radially outwardly facing surface, as seen in a section which includes the axis, is concave.

5. A sealing ring according to claim 1 and made in two parts, joined by welding along a line in the said radially outwardly facing surface.

6. A sealing ring according to claim 1 wherein the convergent walls are extended radially inwards from the region of their convergence, the said extensions being made divergent so that the end portions of the walls also form sealing surfaces.

7. A sealing ring according to claim 6 wherein the said extensions are flattened off at their ends to give good sealing contact at these points.

8. A sealing ring according to claim 6 wherein the sealing surfaces of the end portions of said extensions are further apart than the other sealing surfaces of the washer or gasket.